US008121082B2

(12) United States Patent
Pajukoski et al.

(10) Patent No.: US 8,121,082 B2
(45) Date of Patent: Feb. 21, 2012

(54) DTX DETECTION WHEN ACK/NACK IS TRANSMITTED WITH SCHEDULING REQUEST

(75) Inventors: Kari Pajukoski, Oulu (FI); Esa Tiirola, Kempele (FI); Kari Hooli, Oulu (FI); Jari Lindholm, Palojoki (FI)

(73) Assignee: Nokia Siemens Networks Oy, Espoo (FI)

( * ) Notice: Subject to any disclaimer, the term of this patent is extended or adjusted under 35 U.S.C. 154(b) by 398 days.

(21) Appl. No.: 12/322,544

(22) Filed: Feb. 3, 2009

(65) Prior Publication Data

US 2009/0219897 A1 Sep. 3, 2009

Related U.S. Application Data

(60) Provisional application No. 61/063,712, filed on Feb. 5, 2008, provisional application No. 61/066,880, filed on Feb. 22, 2008.

(51) Int. Cl.
H04W 4/00 (2009.01)
(52) U.S. Cl. ...................................................... 370/329
(58) Field of Classification Search .................. 370/328, 370/329, 331; 455/450, 436, 433, 437, 435.1
See application file for complete search history.

(56) References Cited

U.S. PATENT DOCUMENTS

| 7,315,527 | B2 * | 1/2008 | Wei et al. ........................ 370/328 |
| 2007/0268870 | A1 | 11/2007 | Buckley et al. ................. 370/335 |

FOREIGN PATENT DOCUMENTS

| EP | 1655879 A1 | 5/2006 |
| WO | WO-2005/018270 A2 | 2/2005 |

OTHER PUBLICATIONS

Providing Improved Scheduling Request Signaling with ACK/NACK or CQI', U.S. Appl. No. 12/290,547, Kari Pajukoski and Esa Tiirola filed on Oct. 30, 2008.
3GPP TSG RAN WG1 Meeting #51 bis, Sevilla, Spain, Jan. 14-18, 2008, pp. 1-6.
"Multiplexing of ACK/NACK and Scheduling Request on PUCCH", TSG-RAN WG1, Sevilla, Spain, Jan. 14-18, 2008, pp. 1-4.
3GPP TS 36.211 V8.1.0 (Nov. 2007), $3^{rd}$ Generation Partnership Project; Technical Specification Group Radio Access Network; Evolved Universal Terrestrial Radio Access (E-UTRA); Physical Channels and Modulation (Release 8).
3GPP TS 36.300 V8.3.0 (Dec. 2007), $3^{rd}$ Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 8).

* cited by examiner

*Primary Examiner* — Ricky Ngo
*Assistant Examiner* — Chandrahas Patel
(74) *Attorney, Agent, or Firm* — Harrington & Smith

(57) ABSTRACT

A method for signaling between a mobile apparatus (10) and a network node (12) is described. The method includes generating a message that includes a scheduling request. Determining whether a second indication (e.g., an acknowledgment) is to be transmitted in a sub-frame with the first indication is also included. The method includes, in response to a determination that the second indication is not to be included, the message is configured in a first configuration and, in response to a determination that the second indication is to be included, the message also includes the second indication and the message is configured in a second configuration. The first configuration is distinct from the second configuration. The method also includes sending the message, via a wireless transmitter, in the sub-frame. Apparatus and computer-readable media are also described.

18 Claims, 9 Drawing Sheets

MAPPING OF 1 BIT ACK/NACK CONSTELLATIONS

MAPPING OF 2 BITS ACK/NACK CONSTELLATIONS

MAPPING OF 1 BIT ACK/NACK CONSTELLATION

| CYCLIC SHIFT | OC$_{INDEX}$=0 | OC$_{INDEX}$=1 | OC$_{INDEX}$=2 | OC$_{INDEX}$=3 |
|---|---|---|---|---|
| 0 | ACK/NACK | | ACK/NACK | |
| 1 | | SR | | SR |
| 2 | ▨ | | ▨ | |
| 3 | | ▨ | | ▨ |
| 4 | ▨ | | ▨ | |
| 5 | | ▨ | | ▨ |
| 6 | ▨ | | ▨ | |
| 7 | | ▨ | | ▨ |
| 8 | ▨ | | ▨ | |
| 9 | | ▨ | | ▨ |
| 10 | ▨ | | ▨ | |
| 11 | | ▨ | | ▨ |

R1-080343

| CYCLIC SHIFT | OC$_{INDEX}$=0 | OC$_{INDEX}$=1 | OC$_{INDEX}$=2 | OC$_{INDEX}$=3 |
|---|---|---|---|---|
| 0 | ACK/NACK | | SR | |
| 1 | | ACK/NACK | | SR |
| 2 | ▨ | | ▨ | |
| 3 | | ▨ | | ▨ |
| 4 | ▨ | | ▨ | |
| 5 | | ▨ | | ▨ |
| 6 | ▨ | | ▨ | |
| 7 | | ▨ | | ▨ |
| 8 | ▨ | | ▨ | |
| 9 | | ▨ | | ▨ |
| 10 | ▨ | | ▨ | |
| 11 | | ▨ | | ▨ |

PREFERRED MAPPING

FIG.7

DTX DETECTION WHEN ACK/NACK IS TRANSMITTED WITH SCHEDULING REQUEST

CROSS REFERENCE

This patent application claims priority under 35 U.S.C. §119(e) from U.S. Provisional Patent Application No. 61/063,712, filed Feb. 5, 2008, and U.S. Provisional Patent Application No. 61/066,880, filed Feb. 22, 2008, the disclosures of which are incorporated by reference herein in their entirety.

TECHNICAL FIELD

The exemplary and non-limiting embodiments of this invention relate generally to wireless communication systems, methods, devices and computer programs and, more specifically, relate to signaling techniques between a mobile apparatus and a network node.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that appear in the specification and drawings are defined as follows:

| | |
|---|---|
| 3GPP | third generation partnership project |
| ACK | acknowledge |
| aGW | access gateway |
| BW | bandwidth |
| C-Plane | control plane |
| CQI | channel quality indication |
| DL | downlink |
| DTX | discontinuous transmission |
| eNB | EUTRAN Node B (evolved Node B) |
| EUTRAN | evolved UTRAN |
| FDMA | frequency division multiple access |
| LTE | long term evolution |
| MAC | medium access control |
| MM | mobility management |
| NACK | negative acknowledge |
| Node B | base station |
| OC | orthogonal cover |
| OFDMA | orthogonal frequency division multiple access |
| PDCP | packet data convergence protocol |
| PHY | physical |
| PDSCH | physical downlink shared channel |
| PUCCH | physical uplink control channel |
| PUSCH | physical uplink shared channel |
| RLC | radio link control |
| RRC | radio resource control |
| RRM | radio resource management |
| RS | reference signal |
| SC-FDMA | single carrier, frequency division multiple access |
| SDU | service data unit |
| SR | scheduling request |
| UE | user equipment |
| UL | uplink |
| U-Plane | user plane |
| UTRAN | universal terrestrial radio access network |

A proposed communication system known as evolved UTRAN (E-UTRAN, also referred to as UTRAN-LTE or as E-UTRA) is currently under development within the 3GPP. The current working assumption is that the DL access technique will be OFDMA, and the UL access technique will be SC-FDMA.

One specification of interest to these and other issues related to the invention is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1 reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC (Evolved Packet Core), more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

The eNB hosts the following functions:
- functions for Radio Resource Management: Radio Bearer Control, Radio Admission Control, Connection Mobility Control, Dynamic allocation of resources to UEs in both uplink and downlink (scheduling);
- IP header compression and encryption of user data stream;
- selection of a MME at UE attachment;
- routing of User Plane data towards Serving Gateway;
- scheduling and transmission of paging messages (originated from the MME);
- scheduling and transmission of broadcast information (originated from the MME or O&M); and
- measurement and measurement reporting configuration for mobility and scheduling.

Two documents of particular interest to the ensuing discussion are TSG-RAN WG1, R1-080343, Sevilla, Spain, Jan. 14-18, 2008, Source: Ericsson, Title: Multiplexing of ACK/NACK and Scheduling Request on PUCCH (referred to hereafter as R1-080343), and 3GPP TSG RAN WG1 Meeting #51bis, R1-080035, Sevilla, Spain, Jan. 14-18, 2008, Source: Samsung, Nokia, Nokia Siemens Networks, Panasonic, TI, Title: Joint proposal on uplink ACK/NACK channelization, (referred to hereafter as R1-080035).

Reference can also be made to 3GPP TR 36.211, V8.1.0 (2007-11), 3rd Generation Partnership Project; Technical Specification Group Radio Access Network; Physical Channels and Modulation (Release 8), for a description in Section 5 of the UL physical channels, including the PUCCH and the PUSCH.

In accordance with a current agreement in 3GPP the simultaneous transmission of SR and ACK/NACK is to be supported. However, the specifics of the multiplexing method and the exact transport format have been reserved for future study. It can be noted though that a widely accepted approach for multiplexing the SR and ACK/NACK is for the ACK/NACK to be sent from the SR resource if the SR and ACK/NACK need to be transmitted simultaneously. It has been agreed that SR is transmitted by using on/off keying with unmodulated RS sequences.

It is noted that when referring to the SR, TS 36.21x series utilizes the term PUCCH Format 1. Correspondingly, when referring to ACK/NACK as a general term, PUCCH Formats 1a/1b are meant. Table 1 below summarizes the available PUCCH Formats:

TABLE 1

PUCCH Formats

| PUCCH Formats | Control type |
| --- | --- |
| PUCCH Format 1 | Scheduling request |
| PUCCH Format 1a | 1-bit ACK/NACK |
| PUCCH Format 1b | 2-bit ACK/NACK |
| PUCCH Format 2 | CQI |
| PUCCH Format 2a | CQI + 1-bit ACK/NACK |
| PUCCH Format 2b | CQI + 2-bit ACK/NACK |

A problem that arises relates to DTX detection in the case where ACK/NACK/DTX is transmitted simultaneously with the SR.

The DTX situation relates to a failure of a DL resource allocation grant transmitted to a particular UE. When the DL resource allocation fails the ACK/NACK(s) associated with the PDCCH/PDSCH are missing from the given UL sub-frame (this is DTX from the ACK/NACK point of view), since the UE has for whatever reason missed the DL allocation and therefore has no reason to transmit or include an ACK/NACK in the UL subframe. However, the eNB cannot know that the ACK/NACK is not present and may, as a result, incorrectly interpret the reception from the UE.

It may be possible to employ a DL ACK/NACK DTX detector to attempt to solve the problem, e.g., to identify whether the DL ACK/NACK is present or not. However, if the ACK/NACK DTX detector fails then it is possible that at least two types of errors can occur.

A first error type may be referred to as misdetection, DTX→ACK/NACK: wherein the DL resource allocation grant fails but eNB cannot detect that this has occurred.

A second error type may be referred to as a false alarm, ACK/NACK→DTX: wherein the eNB considers that the DL allocation grant has failed even though it has been correctly received by the UE.

In this context DTX corresponds to signaling of the SR instead of the combination of the ACK/NACK and SR.

As can be appreciated, the error cases in this type of SR and ACK/NACK multiplexing scheme can result in serious problems, in particular in a so called DTX (SR)→ACK error case, and should thus be considered when developing the multiplexing scheme for the SR and ACK/NACK.

The DTX to ACK error occurs when the eNB detects an ACK, even though an ACK was not sent by the UE, but only the SR. The combination of DL scheduling information miss detection and the DTX to ACK error (for the DL-SCH) has an impact on higher layer protocols, e.g., it can result in higher layer error. Interpreting the received SR as an ACK is a particularly troublesome error situation from the DL point of view since a DL transmission is erroneously assumed to have been correctly received by the UE. This implies that the higher protocol layers must eventually detect the missed DL transmission by the UE, and then provide some means to recover. In general, this type of higher protocol layer error recovery would be significantly slower than a L1 recovery, and would require significantly more signaling overhead to accomplish. It is thus desirable that such error cases occur, if at all, at a very low rate.

One ACK/NACK and SR multiplexing method is proposed in R1-080343. However, various error cases, especially the DTX to ACK error case, are not considered.

SUMMARY

The below summary section is intended to be merely exemplary and non-limiting.

The foregoing and other problems are overcome, and other advantages are realized, by the use of the exemplary embodiments of this invention.

In a first aspect thereof the exemplary embodiments of this invention provide

An exemplary embodiment in accordance with this invention is a method for signaling between a mobile apparatus (10) and a network node (12). The method includes generating a message that includes a first indication of a scheduling request. Determining whether a second indication is to be transmitted in a sub-frame with the first indication is also included. The second indication (e.g., an acknowledgment) indicates that a downlink resource allocation grant has succeeded and that all corresponding codewords have been detected correctly. The method includes, in response to a determination that the second indication is not to be included, the message is configured in a first configuration and in response to a determination that the second indication is to be included, the message also includes the second indication and the message is configured in a second configuration. The first configuration is distinct from the second configuration. The method also includes sending the message, via a wireless transmitter, in the sub-frame.

A further exemplary embodiment in accordance with this invention is an apparatus (10) for signaling between a mobile apparatus (10) and a network node (12). The apparatus (10) includes a message generating module configured to generate a message including a scheduling request. A determination module configured to determine whether an acknowledgement is to be transmitted in a same sub-frame as the message is also included. The message generating module is also configured: in response to a determination that the acknowledgement is not to be included, to configure the message in a first configuration, and in response to a determination that the acknowledgement is to be included, to configure the message in a second configuration that includes the acknowledgement. The first configuration is distinct from the second configuration.

An additional exemplary embodiment in accordance with this invention is a computer-readable medium tangibly encoding a computer program including program instructions, execution of the program instructions resulting in operations for signaling between a mobile apparatus (10) and a network node (12). The operations include generating a message including a scheduling request and determining whether an acknowledgement is to be transmitted in a same sub-frame as the scheduling request. In response to a determination that the acknowledgement is not to be included, the message is configured in a first configuration, and in response to a determination that the acknowledgement is to be included, the message is configured in a second configuration including the acknowledgement. The first configuration is distinct from the second configuration.

A further exemplary embodiment in accordance with this invention is an apparatus (10) for signaling between a mobile apparatus (10) and a network node (12). The apparatus (10) includes 32. An apparatus (10) includes message generation means (10F) for generating a message including a scheduling request; and first determining means (10E) for determining whether an acknowledgement is to be transmitted in a same sub-frame as the message. The message generation means (10F) is also for: configuring the message in a first configuration in response to a determination that the acknowledgement is not to be included, and configuring the message in a second configuration including the acknowledgement in response to a determination that the acknowledgement is to be included. The first configuration is distinct from the second configuration.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 7 contrasts a previously proposed ACK/NACK channelization with one made possible by the use of certain exemplary embodiments of this invention.

DETAILED DESCRIPTION

One exemplary and non-limiting procedure for multiplexing the SR and ACK/NACK is described in commonly owned U.S. Provisional Patent Application No. 61/001,207, filed Oct. 30, 2007, entitled: Apparatus, Method, and Computer Program Product Providing Improved Scheduling Request Signaling with ACK/NACK or CQI, by Kari Pajukoski and Esa Tiirola.

Another exemplary and non-limiting procedure for multiplexing the SR and ACK/NACK is described in commonly owned U.S. Provisional Patent Application No. 60/936,033, filed Jun. 18, 2007, entitled: Multiplexing of Scheduling Request and ACK/NACK and/or CQI Transmitted on PUCCH, by Esa Tiirola, Kari Pajukoski, Kari Hooli and Esa Malkamäki.

The exemplary embodiments of this invention are generally related to the 3GPP LTE standardization, and in particular to SR transmission with and without simultaneous ACK/NACK transmission on the PUCCH.

It should be noted, however, that while the exemplary embodiments are described below in the context of the E-UTRAN (UTRAN-LTE) system, the exemplary embodiments of this invention are not limited for use with only this one particular type of wireless communication system, and they may be used to advantage in other wireless communication systems.

Figure 1:
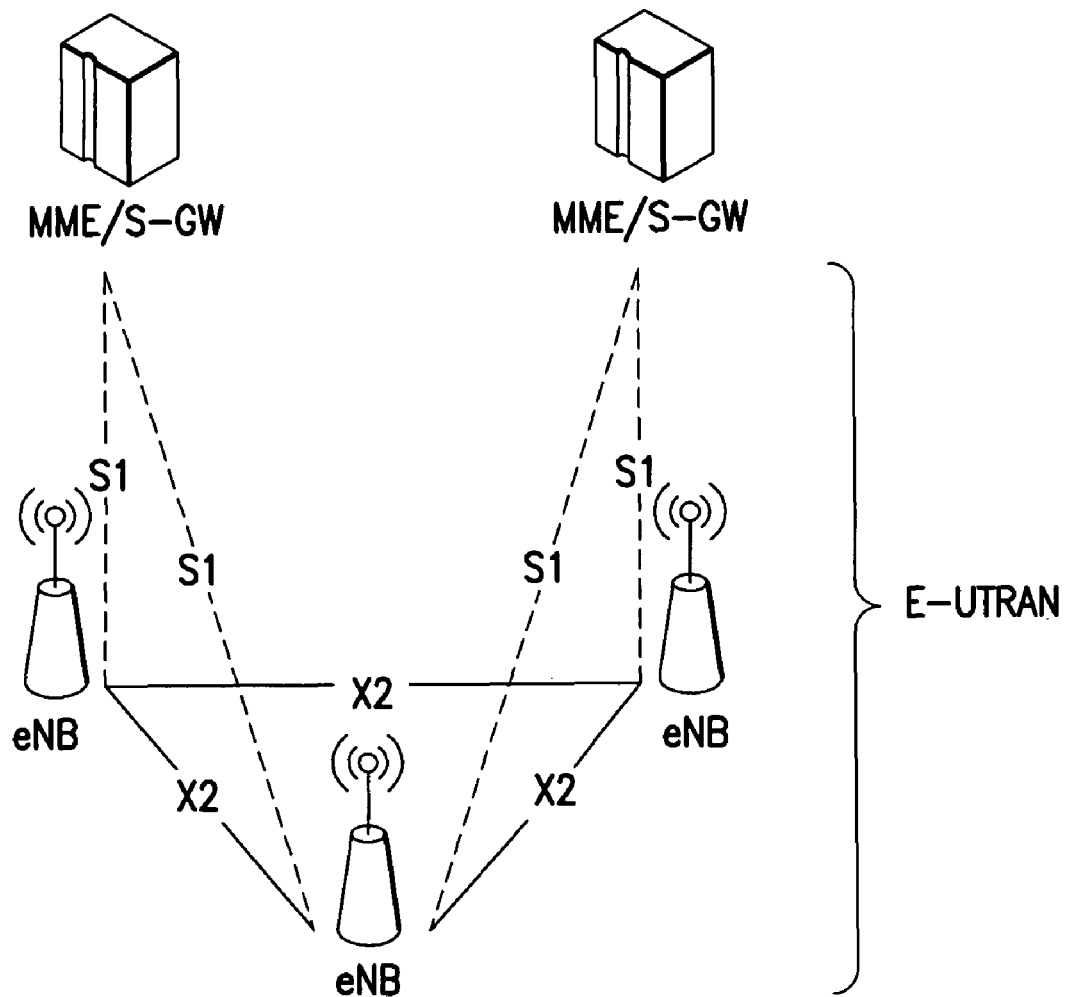
FIG. 1 reproduces FIG. 4 of 3GPP TS 36.300, and shows the overall architecture of the E-UTRAN system.
Figure 2:
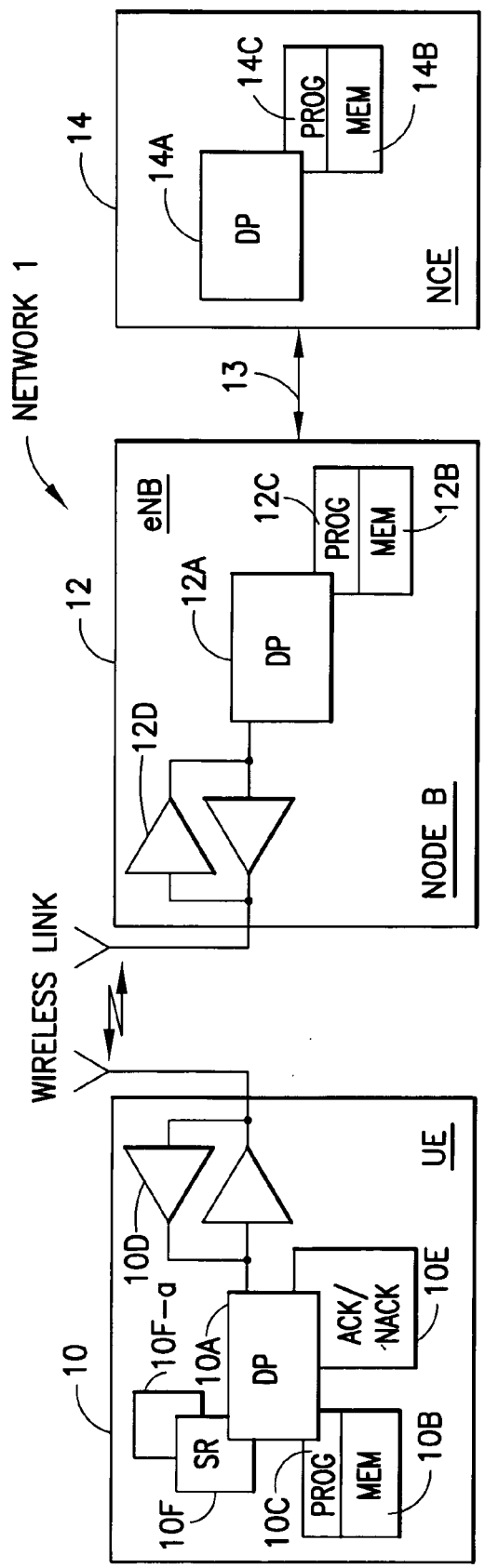
FIG. 2 shows a simplified block diagram of various electronic devices that are suitable for use in practicing the exemplary embodiments of this invention.

Reference is made to FIG. 2 for illustrating a simplified block diagram of various electronic devices that are suitable for use in practicing the exemplary embodiments of this invention. In FIG. 2 a wireless network 1 is adapted for communication with an apparatus 10, also referred to herein for convenience as a UE 10, via another apparatus, such as a network access node 12, also referred to herein for convenience as a Node B (base station) and more specifically an eNB 12. The network 1 may include a network control element (NCE) 14 that may include the MME/S-GW functionality shown in FIG. 1.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas.

The eNB 12 includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1. The eNB 12 may also be coupled to another eNB via a data/control path (not shown), which may be implemented as the X2 interface shown in FIG. 1.

The NCE 14 a controller, such as a computer or a data processor (DP) 14A and a computer-readable memory medium embodied as a memory (MEM) 14B storing an associated program of computer instructions (PROG) 14C.

At least one of the PROGs 10C and 12C is assumed to include program instructions that, when executed by the associated DP, enable the electronic device to operate in accordance with the exemplary embodiments of this invention, as will be discussed below in greater detail. That is, the exemplary embodiments of this invention may be implemented at least in part by computer software executable by the DP 10A of the UE 10 and by the DP 12A of the eNB 12, or by hardware, or by a combination of software and hardware.

The UE 10 may be assumed to include an ACK/NACK resource processor 10E, as well as a SR resource processor 10F.

Typically there will be a plurality of UEs 10 serviced by the eNB 12. The eNBs 10 may or may not be identically constructed, but in general are all assumed to be electrically and logically compatible with the relevant network protocols and standards needed for operation in the wireless network 1.

The various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer Readable MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory.

The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Discussed now several exemplary approaches to solving (avoiding) the DTX to ACK problem that was discussed above.

In a first approach the SR plus DTX is transmitted by using the same constellation point as a NACK, with the goal being to maximize the separation between the ACK and SR signals. Constellation points may be represented using one or more modulation symbols, e.g., one or more digital bits. In this regard it is desirable to realize the maximum separation by selecting the constellation points for ACK/NACK in such a way that the NACK constellation point corresponds to the unmodulated RS sequence. In this manner the constellation arrangements for SR only, for SR plus DTX and for SR plus NACK are the same. Thus, the constellation points for ACK/NACK are such that the DTX-to-ACK problem is minimized since a DTX detection failure of an SR plus DTX would most likely read an SR plus NACK.

Referring again to U.S. Provisional Patent Application No. 61/001,207, or alternatively to R1-080343, the multiplexing of the SR and ACK/NACK may be accomplished in the following manner. With SR=0 (e.g., in the case of negative SR transmission), the UE 10 transmits the ACK/NACK information using the ACK/NACK resources, with SR=1 (e.g., in the case of positive SR transmission), the UE 10 transmits the ACK/NACK information using the SR resources. When UE 10 sends the SR it uses the constellation arrangement shown in FIG. 3 for the mapping of a 1-bit ACK/NACK. The in-phase (I) and quadrature (Q) mapping of constellation points is according to the Table shown in FIG. 3.

Figure 4:
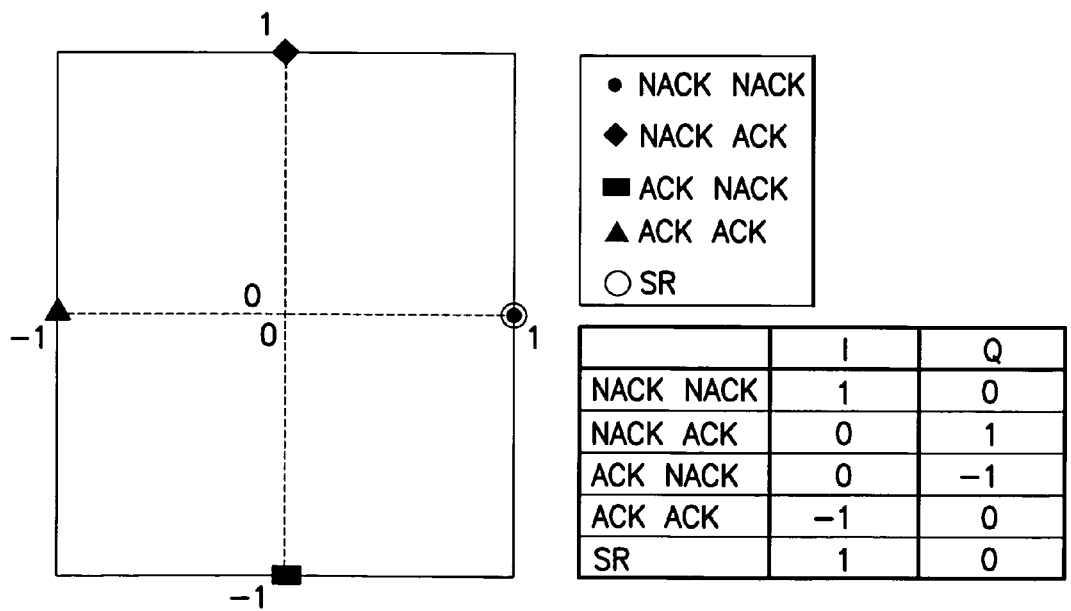
FIG. 4 shows an exemplary constellation mapping of 2-bit ACK/NACK in accordance with the exemplary embodiments of this invention.

FIG. 4 shows the mapping of a 2-bit ACK/NACK, where the I and Q mapping of constellation points is according to the Table shown in FIG. 4. This mapping is a non-limiting example. The constellation points used may be changed in accordance with this invention, for example, the ACK/NACK and NACK/ACK coordinates may be switched.

Figure 3:
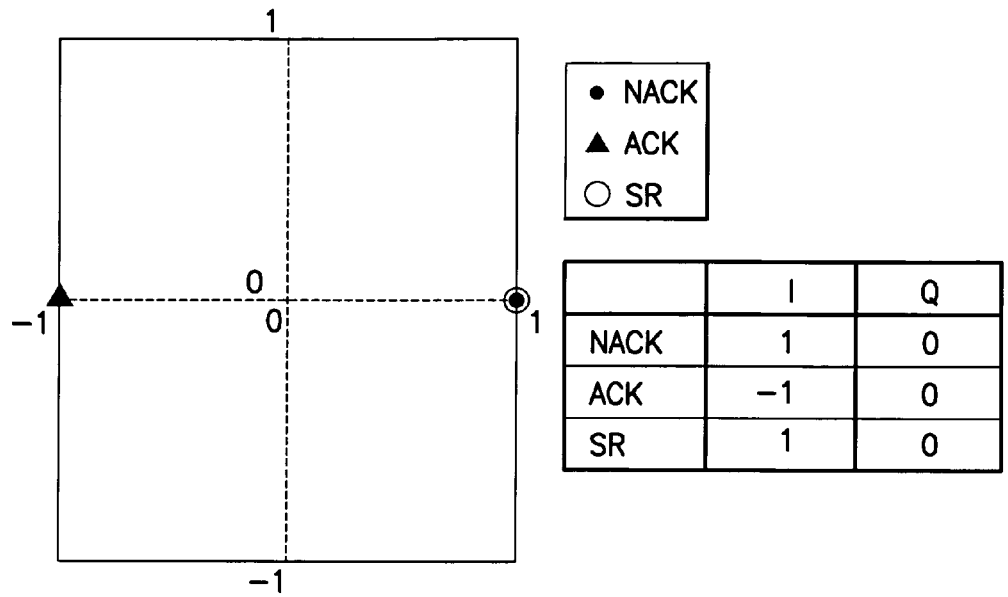
FIG. 3 shows an exemplary constellation mapping of 1-bit ACK/NACK in accordance with the exemplary embodiments of this invention.

As can be appreciated in view of FIGS. 3 and 4, when the UE 10 sends only the SR it uses the NACK (1-bit case) or the NACK/NACK (2-bit case) constellation point (1, 0). It should be noted that constellation point (1, 0) is also used for the transmitting reference signal for SR, as the SR transmission is performed with an unmodulated signal. In this case the DTX to NACK is not detectable in the eNB 12. However, this is not seen as a limitation since explicit DTX detection is not supported in all presently agreed upon UL modulation options. For example, a CQI plus ACK/NACK transmission scheme does not support explicit DTX detection.

Figure 5:
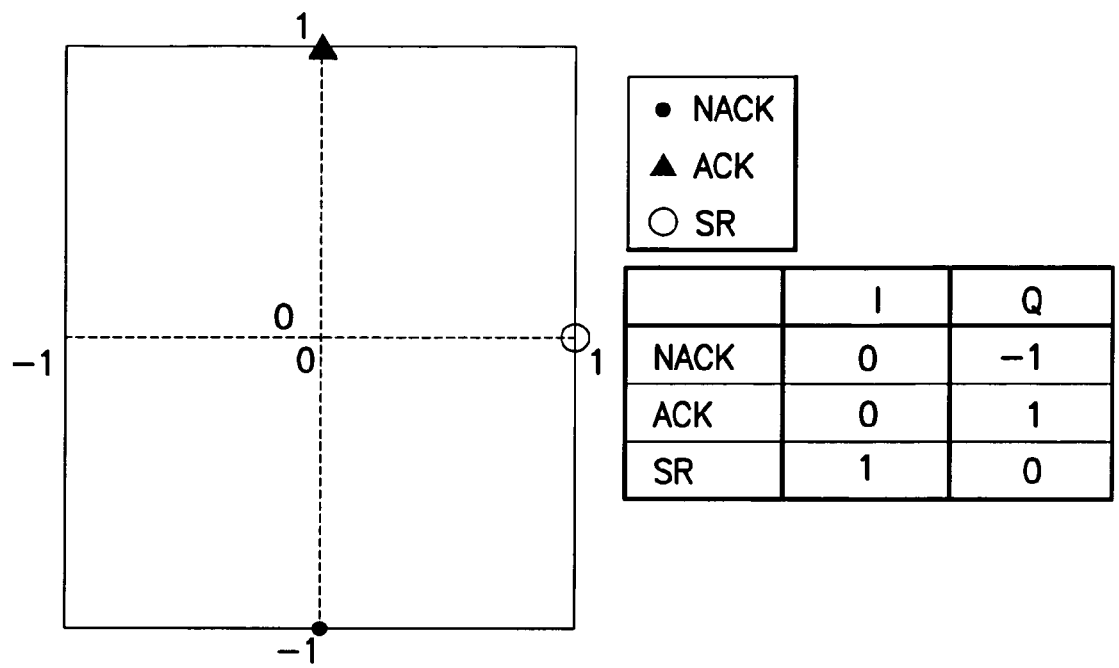
FIG. 5 shows an exemplary constellation mapping of the 1-bit ACK/NACK in accordance with other exemplary embodiments of this invention.

In a second approach in accordance with the exemplary embodiments the ACK/NACK constellations are arranged in such a way that the SR signal and the ACK/NACK signals are separated in the complex domain (see FIG. 5 for the 1-bit ACK/NACK case). Furthermore, for the case of the 2-bit ACK/NACK constellation a re-arrangement between two slots (slot #1, slot #2) is used (as in FIG. 6), thereby maximizing the separation between ACK signal(s) and SR signals.

Figure 6:
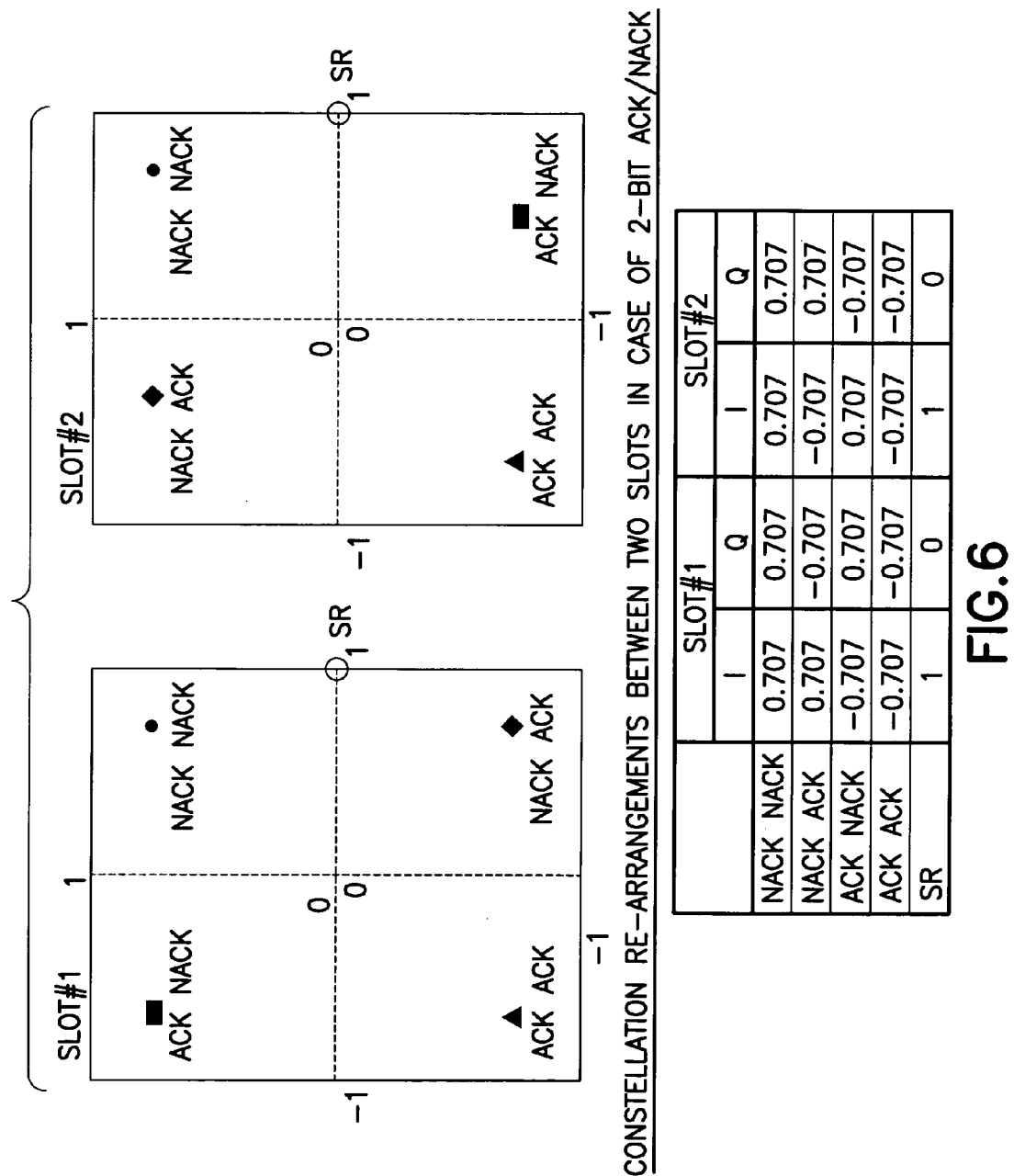
FIG. 6 shows an exemplary constellation mapping of the 2-bit ACK/NACK, with constellation re-arrangements being made across two slots further in accordance with the exemplary embodiments of this invention.
Figure 12:
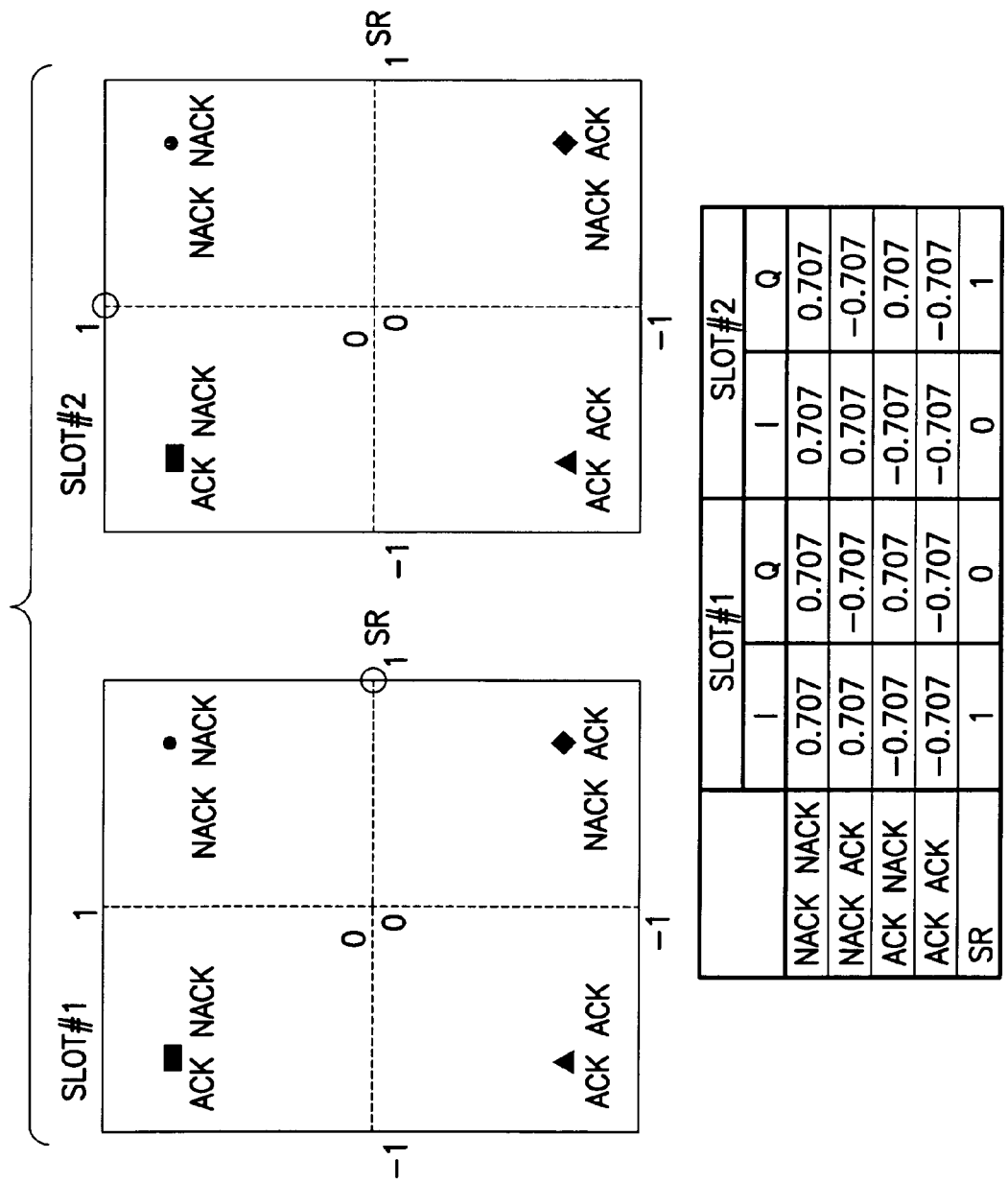
FIG. 12 shows another exemplary constellation mapping of the 2-bit ACK/NACK, with constellation re-arrangements being across two slots further in accordance with the exemplary embodiments of this invention.

As was noted, FIGS. 5 and 6 show exemplary constellations, it being realized that other constellations are possible through either rotations, reflections, or the use of both. In particular, for the case of the 2-bit ACK/NACK constellation one exemplary re-arrangement between slots can be such that ACK/NACK constellation points remain the same in both slots, while the SR constellation point changes between slots (as in FIG. 12). Furthermore, similar constellation points can be alternatively obtained by modulating the pilot part of the resource with the complex conjugate of the constellation point, e.g., in the case of SR and DTX.

In another approach (third) in accordance with the exemplary embodiments a separate periodic SR resource processor 10F-a is configured in order to support DTX detection. The operation in this embodiment is as follows:

with SR=0, the UE 10 transmits the ACK/NACK information using ACK/NACK resources;

with SR=1, the UE 10 transmits the ACK/NACK information using the aperiodic SR resources; and with SR=1 and DTX, the UE 10 transmits the SR using the periodic SR resource resources.

It is noted that improved DTX detection is available where both periodic and aperiodic SR resources are available. The eNB 12 can identify the possible DL grant failure by comparing signals at the SR only resource (periodic) and ACK/NACK+SR resource (aperiodic).

In general, a periodic SR resource may be considered as the primary SR resource. For example, a certain UE 10 has an opportunity to transmit the SR using a pre-determined cyclic shift and OC resource on a given PRB. The periodic SR resource 10F, configured with higher layer signaling, thus occurs periodically.

The aperiodic SR resource applies to the third approach discussed above. The multiplexing scheme is designed in such a way that the ACK/NACK channel automatically contains a resource to be used when transmitting ACK/NACK and positive SR in the same sub-frame. The aperiodic SR resource 10F-a is considered to be available only when a certain UE 10 is transmitting ACK/NACK on the PUCCH, and may be considered to be linked to the ACK/NACK channel.

The use of the third approach implies that the UE 10 has the capability to also send the SR in sub-frames other than those where the periodic SR resource 10F-a is available. As a result, if the UE 10 has DL data to receive (ACK/NACK resource is mapped), the UE 10 does not need to wait for the periodic SR resource 10F-a and a faster request of resources is made possible. Note, however, that in this case the improved DTX detection in the eNB 12 as described above may not be performed. This approach may thus be viewed as providing a trade-off between improved DTX detection and improved SR delay performance. In this case the modulation constellations shown in FIGS. 3, 4, 5 and 6 may be used to improve the DTX detection.

It is noted that improved SR delay made possible by this embodiment is obtained for those services where the need for a SR transmission is triggered by the DL data transmission (e.g., web browsing is one exemplary application where this is the case).

A significant improvement as compared to previously proposed techniques can be seen by referring to FIG. 7, which assumes the case of normal CP with 12 ACK/NACK channels in use. In the third approach discussed above the mapping between ACK/NACK and the SR is changed, as compared to the approach presented in R1-080343. One advantage of this approach is that existing ACK/NACK channelization principles agreed to in R1-080035 can be maintained, and compatibility can also be maintained with mapping schemes agreed to for the extended CP. More specifically, for the extended CP no changes are needed to proposed ACK/NACK channelization, while the normal CP may utilize the ACK/NACK channelization of the extended CP.

In accordance with yet another (fourth) approach the exemplary embodiments exploit the fact that the ACK/NACK and SR resources can be divided into a data part and a pilot part (e.g., RS sequence) containing a reference signal. In order to support DTX detection, the operation in this case is as follows:

with SR=0 the UE 10 transmits the ACK/NACK using the ACK/NACK resource;

with SR=1, the UE 10 transmits the ACK/NACK using either the data part of the SR resource and the pilot part of the ACK/NACK resource, or by using the pilot part of the SR resource and the data part of the ACK/NACK resource; and with SR=1 and DTX, the UE 10 transmits the SR using the SR resource.

As per an agreement in accordance with RAN #52 decisions:

in the case of a negative SR, ACK/NACK is transmitted using the original ACK/NACK resource; and in the case of a positive SR, ACK/NACK is transmitted using the SR resource.

Figure 10:
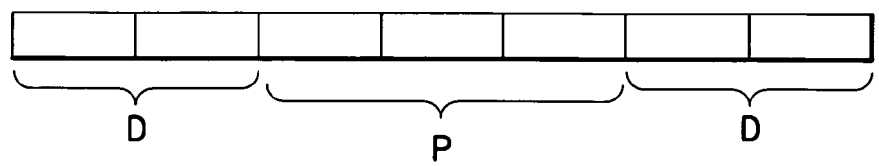
FIG. 10 shows a scheduling request and ACK/NACK resource, and is useful in explaining the operation of a fourth approach made possible by the exemplary embodiments of this invention.

Both the SR and the ACK/NACK resources can be divided into a data part (D) and a pilot part (P). Reference can be made to FIG. 10. Furthermore, it is preferred that both the SR and the ACK/NACK resource be within the same physical resource block.

To implement this fourth approach one may denote the SR resource as containing $P_{SR}$ and $D_{SR}$ and the ACK/NACK resource as containing $P_{AN}$ and $D_{AN}$. Using these notations the operations are as follows:

with SR=0, the UE 10 transmits $P_{AN}$ and $D_{AN}$, where $D_{AN}$ is modulated by ACK/NACK bits;

with SR=1, the UE 10 transmits either:

$P_{SR}$ and $D_{AN}$, and $D_{AN}$ is modulated by ACK/NACK bits, or $P_{AN}$ and $D_{SR}$, and $D_{SR}$ is modulated by ACK/NACK bits; and with SR=1 and DTX, the UE 10 transmits $P_{SR}$ and $D_{SR}$.

Figure 8:
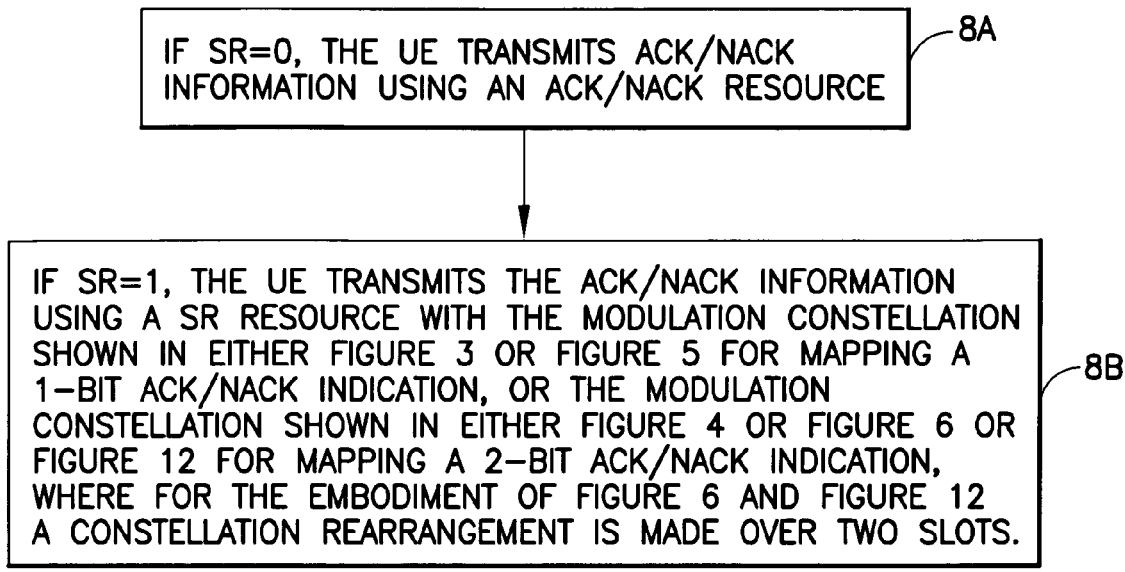
FIGS. 8 and 9 are logic flow diagrams that illustrate the operation of methods, and a result of execution of computer program instructions, in accordance with the exemplary embodiments of this invention.

Based on the foregoing it should be apparent that the exemplary embodiments of this invention provide a method, apparatus and computer programs for the UE 10 to indicate a DTX situation to the eNB 12. Referring to FIG. 8, at Block 8A if SR=0, the UE transmits ACK/NACK information using an ACK/NACK resource, while at Block 8B if SR=1, the UE transmits the ACK/NACK information using a SR resource with the modulation constellation shown in either FIG. 3 or FIG. 5 for mapping a 1-bit ACK/NACK indication, or the modulation constellation shown in either FIG. 4 or FIG. 6 or FIG. 12 for mapping a 2-bit ACK/NACK indication, where for the embodiment of FIG. 6 and FIG. 12 a constellation rearrangement is made over two slots.

Figure 9:
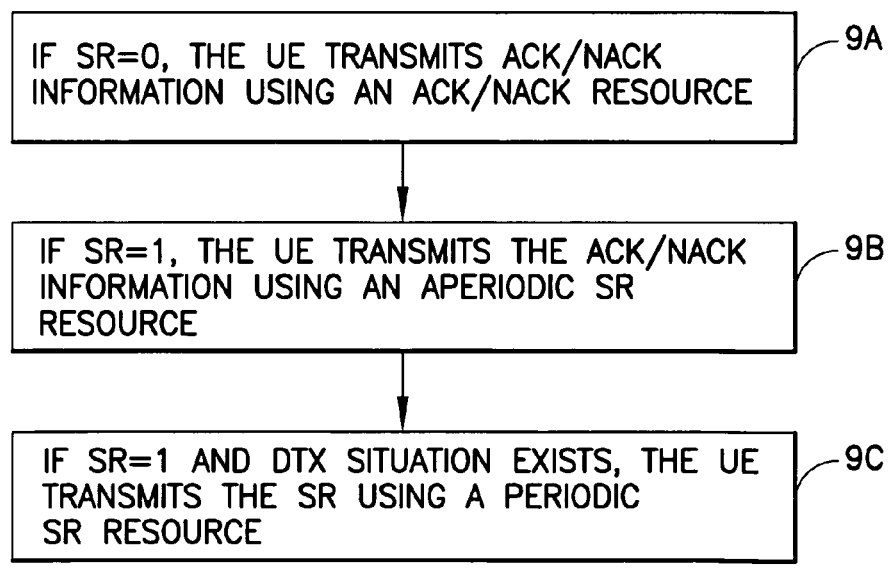

Based on the foregoing it should be further apparent that the exemplary embodiments of this invention also provide a method, apparatus and computer programs for the UE 10 to indicate the DTX situation to the eNB 12 by, referring to FIG. 9 at Block 9A, if SR=0, the UE transmits ACK/NACK information using an ACK/NACK resource, while at Block 9B, if SR=1, the UE transmits the ACK/NACK information using an aperiodic SR resource, while at Block 9C, if SR=1 and a DTX situation exists, the UE transmits the SR using a periodic SR resource.

As non-limiting examples, the eNB 12 is enabled to identify the possible DL grant failure by comparing signals at the SR only resource (periodic) and the ACK/NACK+SR resource (aperiodic), or by measuring the power of ACK/NACK+SR resource and comparing it to some predefined threshold value, or by comparing signals at the data and pilot parts of SR resource and at the data and pilot parts of the ACK/NACK resource.

Figure 11:
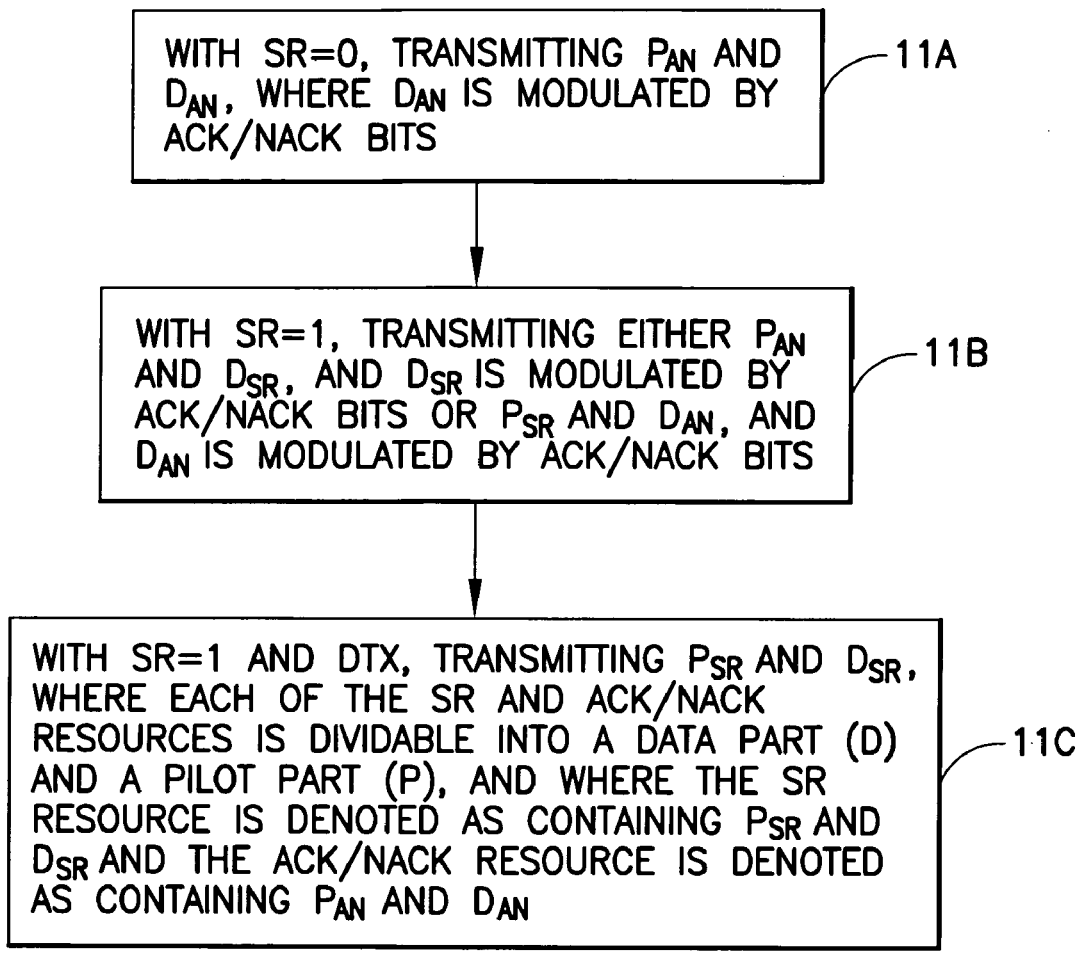
FIG. 11 is a logic flow diagram that illustrates the operation of a method, and a result of execution of computer program instructions, further in accordance with the exemplary embodiments of this invention.

FIG. 11 is a logic flow diagram that illustrates the operation of a method, and a result of execution of computer program instructions, further in accordance with the exemplary embodiments of this invention. At Block 11A, with SR=0, the UE transmits $P_{AN}$ and $D_{AN}$, where $D_{AN}$ is modulated by ACK/NACK bits; at Block 11B, with SR=1, the UE transmits either $P_{AN}$ and $D_{SR}$, and $D_{SR}$ is modulated by ACK/NACK bits or $P_{SR}$ and $D_{AN}$, and $D_{AN}$ is modulated by ACK/NACK bits and, at Block 11C, with SR=1 and DTX, the UE transmits $P_{SR}$ and $D_{SR}$, where each of the SR and ACK/NACK resources is dividable into a data part (D) and a pilot part (P), and where the SR resource is denoted as containing $P_{SR}$ and $D_{SR}$ and the ACK/NACK resource is denoted as containing $P_{AN}$ and $D_{AN}$.

The eNB 12 is, constructed and operated so as to receive and correctly interpret the UL signaling from the UE 10 for either or both of the embodiments shown in FIGS. 8, 9 and 11.

The various blocks shown in FIGS. 8, 9 and 11 may be viewed as method steps, and/or as operations that result from operation of computer program code, and/or as a plurality of coupled logic circuit elements constructed to carry out the associated function(s).

An exemplary embodiment in accordance with this invention is a method for signaling between a mobile apparatus (10) and a network node (12). The method includes generating a message that includes a first indication of a scheduling request. Determining whether a second indication is to be transmitted in a sub-frame with the first indication is also included. The second indication (e.g., an acknowledgment) indicates that a downlink resource allocation grant has succeeded and that each of at least one corresponding codeword has been detected correctly. The method includes, in response to a determination that the second indication is not to be included, the message is configured in a first configuration and in response to a determination that the second indication is to be included, the message also includes the second indication and the message is configured in a second configuration. The first configuration is distinct from the second configuration. The method also includes sending the message, via a wireless transmitter, in the sub-frame.

In a further exemplary embodiment of the method above, the method also including determining whether a third indication is to be transmitted in a sub-frame with an indication of a scheduling request, where the third indication indicates that a downlink resource allocation grant has succeeded and that each of the at least one corresponding codeword has not been detected correctly. In response to a determination that the third indication is to be included, the message also includes the third indication and the message is configured in a third configuration.

In an additional exemplary embodiment of the method above, when the message is configured in either the second configuration or the third configuration, the message is sent using: acknowledge/negative-acknowledge physical uplink control channel resources when the scheduling request is a negative scheduling request, and scheduling request physical uplink control channel resources when the scheduling request is a positive scheduling request.

In a further exemplary embodiment of the method above, when the message is configured in either the second configuration or the third configuration, the message is sent using: 1) a pilot part of the scheduling request resources and a data part of acknowledgement resources, or 2) a pilot part of the acknowledgement resources and a data part of the scheduling request resources.

In an additional exemplary embodiment of any one of the methods above, the first configuration is identical to the third configuration. Alternatively, the first configuration is distinct from the third configuration, and the second configuration is distinct from the third configuration.

In a further exemplary embodiment of any one of the methods above, the first configuration, second configuration and third configuration are represented using a single modulation symbol. Alternatively, the first configuration, second configuration and third configuration are represented using two modulation symbols.

In an additional exemplary embodiment of any one of the methods above, when the message is configured in either the second configuration or the third configuration, the message is sent using periodic resources.

In a further exemplary embodiment of any one of the methods above, where there are at least two corresponding codewords, a fourth configuration and/or a fifth configuration may be used to indicate that at least one corresponding codeword has been detected correctly and that at least one corresponding codeword has not been detected correctly.

A further exemplary embodiment in accordance with this invention is an apparatus (10) for signaling between a mobile apparatus (10) and a network node (12). The apparatus (10) includes a message generating module configured to generate a message including a scheduling request. A determination module configured to determine whether an acknowledgement is to be transmitted in a same sub-frame as the message is also included. The message generating module is also configured: in response to a determination that the acknowledgement is not to be included, to configure the message in a first configuration, and in response to a determination that the acknowledgement is to be included, to configure the message in a second configuration that includes the acknowledgement. The first configuration is distinct from the second configuration.

In an additional exemplary embodiment of the apparatus (10) above, the determination module is also configured to determine whether a negative-acknowledgement is to be transmitted in the same sub-frame as the message; and the message generating module is also configured to configure the message in a third configuration that includes the negative-acknowledgement in response to a determination that the negative-acknowledgement is to be included.

In a further exemplary embodiment of the apparatus (10) above, the apparatus (10) also includes a transmitter configured to, in response to the message being configured in either the second configuration or the third configuration, send the message using: acknowledge/negative-acknowledge physical uplink control channel resources when the scheduling request is a negative scheduling request, and scheduling request physical uplink control channel resources when the scheduling request is a positive scheduling request.

In an additional exemplary embodiment of the apparatus (10) above, also includes a transmitter (10D) configured to, in response to the message being configured in either the second configuration or the third configuration, send the message using: a pilot part of the scheduling request resources and a data part of acknowledgement resources, and a pilot part of the acknowledgement resources and a data part of the scheduling request resources.

In a further exemplary embodiment of any one of the apparatus (10) above, when the message is configured in either the second configuration or the third configuration, the message is sent using periodic resources.

In an additional exemplary embodiment of any one of the apparatus (10) above, the first configuration is identical to the third configuration. Alternatively, the first configuration is distinct from the third configuration, and the second configuration is distinct from the third configuration.

In a further exemplary embodiment of any one of the apparatus (10) above, the first configuration, second configuration and third configuration are represented using a single modulation symbol. Alternatively, the first configuration, second configuration and third configuration are represented using two modulation symbols.

In an additional exemplary embodiment of any one of the apparatus (10) above, the negative-acknowledgement indicates that a downlink resource allocation grant has succeeded and that each of at least one corresponding codeword has not been detected correctly In a further exemplary embodiment of any one of the apparatus (10) above, the acknowledgement indicates that a downlink resource allocation grant has succeeded and that each of at least one corresponding codeword has been detected correctly In an additional exemplary embodiment of any one of the apparatus (10) above, where there are at least two corresponding codewords, the message generating module is also configured to configure the message in a fourth configuration and/or a fifth configuration in response to at least one corresponding codeword having been detected correctly and at least one corresponding codeword having not been detected correctly.

An additional exemplary embodiment in accordance with this invention is a computer-readable medium tangibly encoding a computer program including program instructions, execution of the program instructions resulting in operations for signaling between a mobile apparatus (10) and a network node (12). The operations include generating a message including a scheduling request and determining whether an acknowledgement is to be transmitted in a same sub-frame as the scheduling request. In response to a determination that the acknowledgement is not to be included, the message is configured in a first configuration, and in response to a determination that the acknowledgement is to be included, the message is configured in a second configuration including the acknowledgement. The first configuration is distinct from the second configuration.

In a further exemplary embodiment of the computer-readable medium above, the operations also include: determining whether a negative-acknowledgement is to be transmitted in the same sub-frame as the message; and in response to a determination that the negative-acknowledgement is to be included, the message is configured in a third configuration including the negative-acknowledgement.

In an additional exemplary embodiment of the computer-readable medium above, when the message is configured in either the second configuration or the third configuration, the message is sent using: acknowledge/negative-acknowledge physical uplink control channel resources when the scheduling request is a negative scheduling request, and scheduling request physical uplink control channel resources when the scheduling request is a positive scheduling request.

In a further exemplary embodiment of the computer-readable medium above, when the message is configured in either the second configuration or the third configuration, the message is sent using: 1) a pilot part of the scheduling request resources and a data part of acknowledgement resources, or 2) a pilot part of the acknowledgement resources and a data part of the scheduling request resources.

In an additional exemplary embodiment of any one of the computer-readable media above, when the message is configured in either the second configuration or the third configuration, the message is sent using periodic resources.

In a further exemplary embodiment of any one of the computer-readable media above, the first configuration is identical to the third configuration. Alternatively, the first configuration is distinct from the third configuration, and the second configuration is distinct from the third configuration.

In an additional exemplary embodiment of any one of the computer-readable media above, the first configuration, second configuration and third configuration are represented using a single modulation symbol. Alternatively, the first configuration, second configuration and third configuration are represented using two modulation symbols.

In a further exemplary embodiment of any one of the computer-readable media above, the negative-acknowledgement indicates that a downlink resource allocation grant has succeeded and that each of at least one corresponding codeword has not been detected correctly In an additional exemplary embodiment of any one of the computer-readable media above, the acknowledgement indicates that a downlink resource allocation grant has succeeded and that each of at least one corresponding codeword has been detected correctly In a further exemplary embodiment of any one of the computer-readable media above, where there are at least two corresponding codewords, the message is configured in a fourth configuration and/or a fifth configuration in response to at least one corresponding codeword having been detected correctly and at least one corresponding codeword having not been detected correctly.

A further exemplary embodiment in accordance with this invention is an apparatus (10) for signaling between a mobile apparatus (10) and a network node (12). The apparatus (10) includes 32. An apparatus (10) includes message generation means (10F) for generating a message including a scheduling request; and first determining means (10E) for determining whether an acknowledgement is to be transmitted in a same sub-frame as the message. The message generation means (10F) is also for: configuring the message in a first configuration in response to a determination that the acknowledgement is not to be included, and configuring the message in a second configuration including the acknowledgement in response to a determination that the acknowledgement is to be included. The first configuration is distinct from the second configuration.

In an additional exemplary embodiment of the apparatus (10) above, the apparatus (10) also includes second determining means (10E) for determining whether a negative-acknowledgement is to be transmitted in the same sub-frame as the message. The message generation means (10F) is also for configuring the message in a third configuration including the negative-acknowledgement in response to a determination that the third indication is to be included.

In a further exemplary embodiment of the apparatus (10) above, the apparatus (10) also includes sending means (10D) configured to, in response to the message being configured in either the second configuration or the third configuration, send the message using: acknowledge/negative-acknowledge physical uplink control channel resources when the scheduling request is a negative scheduling request, and scheduling request physical uplink control channel resources when the scheduling request is a positive scheduling request.

In an additional exemplary embodiment of the apparatus (10) above, the apparatus (10) also includes sending means (10D) configured to, in response to the message being configured in either the second configuration or the third configuration, send the message using: 1) a pilot part of the scheduling request resources and a data part of acknowledgement resources, or 2) a pilot part of the acknowledgement resources and a data part of the scheduling request resources.

In a further exemplary embodiment of any one of the apparatus (10) above, when the message is configured in either the second configuration or the third configuration, the message is sent using periodic resources.

In an additional exemplary embodiment of any one of the apparatus (10) above, the first configuration is identical to the third configuration. Alternatively, the first configuration is distinct from the third configuration, and the second configuration is distinct from the third configuration.

In a further exemplary embodiment of any one of the apparatus (10) above, the first configuration, second configuration and third configuration are represented using a single modulation symbol. Alternatively, the first configuration, second configuration and third configuration are represented using two modulation symbols.

In an additional exemplary embodiment of any one of the apparatus (10) above, the negative-acknowledgement indicates that a downlink resource allocation grant has succeeded and that each of at least one corresponding codeword has not been detected correctly In a further exemplary embodiment of any one of the apparatus (10) above, the acknowledgement indicates that a downlink resource allocation grant has succeeded and that each of at least one corresponding codeword has been detected correctly In an additional exemplary embodiment of any one of the apparatus (10) above, where there are at least two corresponding codewords, the message generating module is also configured to configure the message in a fourth configuration and/or a fifth configuration in response to at least one corresponding codeword having been detected correctly and at least one corresponding codeword having not been detected correctly.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

In addition, and as was noted above, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., CQI, DTX, etc.) are not intended to be limiting in any respect, as these parameters may be identified by any suitable names. Further, the formulas and expressions that use these various parameters may differ from those expressly disclosed herein. Further, the various names assigned to different channels (e.g., PUCCH, PUSCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    generating a message comprising a first indication of a scheduling request,
    determining whether a second indication is to be transmitted in a sub-frame with the first indication, where the second indication indicates that a downlink resource allocation grant has succeeded and that each of at least one corresponding codeword has been detected correctly;
    in response to a determination that the second indication is not to be included, the message is configured in a first configuration, and
    in response to a determination that the second indication is to be included, the message further comprises the second indication and the message is configured in a second configuration,
    where the first configuration is distinct from the second configuration; and
    sending the message, via a wireless transmitter, in the sub-frame,
    the method further comprising:
    determining whether a third indication is to be transmitted in a sub-frame with an indication of a scheduling request, where the third indication indicates that a downlink resource allocation grant has succeeded and that each of the at least one corresponding codeword has not been detected correctly; and
    in response to a determination that the third indication is to be included, the message further comprises the third indication and the message is configured in a third configuration.

2. The method of claim 1, where the at least one corresponding codeword comprises at least two corresponding codewords, the method further comprising:
    determining whether a fourth indication is to be transmitted in a sub-frame with an indication of a scheduling request, where the fourth indication indicates that a downlink resource allocation grant has succeeded, that at least one corresponding codeword of the at least two corresponding codewords has not been detected correctly and that at least one corresponding codeword of the at least two corresponding codewords has been detected correctly; and
    in response to a determination that the fourth indication is to be included, the message further comprises the fourth indication and the message is configured in a fourth configuration.

3. The method of claim 1, where when the message is configured in one of the second configuration and the third configuration, the message is sent using:
    acknowledge/negative-acknowledge physical uplink control channel resources when the scheduling request is a negative scheduling request, and
    scheduling request physical uplink control channel resources when the scheduling request is a positive scheduling request.

4. The method of claim 1, where when the message is configured in one of the second configuration and the third configuration, the message is sent using one of:
    a pilot part of the scheduling request resources and a data part of acknowledgement resources, and
    a pilot part of the acknowledgement resources and a data part of the scheduling request resources.

5. The method of claim 1, where the first configuration is identical to the third configuration.

6. The method of claim 1, where the first configuration is distinct from the third configuration, and the second configuration is distinct from the third configuration.

7. The method of claim 1, where the first configuration, second configuration and third configuration are represented using a single modulation symbol.

8. The method of claim 1, where the first configuration, second configuration and third configuration are represented using two modulation symbols.

9. The method of claim 1, where when the message is configured in one of the second configuration and the third configuration, the message is sent using periodic resources.

10. An apparatus comprising:
message generation means for generating a message comprising a scheduling request; and
first determining means for determining whether an acknowledgement is to be transmitted in a same sub-frame as the message;
where the message generation means is further for:
configuring the message in a first configuration in response to a determination that the acknowledgement is not to be included, and
configuring the message in a second configuration comprising the acknowledgement in response to a determination that the acknowledgement is to be included,
where the first configuration is distinct from the second configuration,
further comprising:
second determining means for determining whether a negative-acknowledgement is to be transmitted in the same sub-frame as the message,
where the message generation means is further for configuring the message in a third configuration comprising the negative-acknowledgement in response to a determination that the negative-acknowledgement is to be included.

11. The apparatus of claim 10, where the negative-acknowledgement indicates that a downlink resource allocation grant has succeeded and that each of at least one corresponding codeword has not been detected correctly.

12. An apparatus comprising:
a message generating module configured to generate a message comprising a scheduling request; and
a determination module configured to determine whether an acknowledgement is to be transmitted in a same sub-frame as the message;
where the message generating module is further configured:
in response to a determination that the acknowledgement is not to be included, to configure the message in a first configuration, and
in response to a determination that the acknowledgement is to be included, to configure the message in a second configuration that comprises the acknowledgement,
where the first configuration is distinct from the second configuration,
where the determination module is further configured to determine whether a negative-acknowledgement is to be transmitted in the same sub-frame as the message; and
the message generating module is further configured to configure the message in a third configuration that comprises the negative-acknowledgement in response to a determination that the negative-acknowledgement is to be included.

13. The apparatus of claim 12, further comprising a transmitter configured to, in response to the message being configured in one of the second configuration and the third configuration, send the message using:
acknowledge/negative-acknowledge physical uplink control channel resources when the scheduling request is a negative scheduling request, and
scheduling request physical uplink control channel resources when the scheduling request is a positive scheduling request.

14. The apparatus of claim 12, further comprising a transmitter configured to, in response to the message being configured in one of the second configuration and the third configuration, send the message using:
a pilot part of the scheduling request resources and a data part of acknowledgement resources, and
a pilot part of the acknowledgement resources and a data part of the scheduling request resources.

15. The apparatus of claim 12, where the negative-acknowledgement indicates that a downlink resource allocation grant has succeeded and that each of at least one corresponding codeword has not been detected correctly.

16. The apparatus of claim 12, where the acknowledgement indicates that a downlink resource allocation grant has succeeded and that each of at least one corresponding codeword has been detected correctly.

17. A non-transitory computer-readable medium tangibly encoding a computer program comprising program instructions, execution of the program instructions resulting in operations comprising:
generating a message comprising a scheduling request,
determining whether an acknowledgement is to be transmitted in a same sub-frame as the scheduling request;
in response to a determination that the acknowledgement is not to be included, the message is configured in a first configuration, and
in response to a determination that the acknowledgement is to be included, the message is configured in a second configuration comprising the acknowledgement,
where the first configuration is distinct from the second configuration,
where the operations further comprise:
determining whether a negative-acknowledgement is to be transmitted in the same sub-frame as the message; and
in response to a determination that the negative-acknowledgement is to be included, the message is configured in a third configuration comprising the negative-acknowledgement.

18. The computer-readable medium of claim 17, where the negative-acknowledgement indicates that a downlink resource allocation grant has succeeded and that each of at least one corresponding codeword has not been detected correctly.

* * * * *